United States Patent [19]
Borthwick, Jr. et al.

[11] Patent Number: 5,701,084
[45] Date of Patent: Dec. 23, 1997

[54] INSULATED CAPACITANCE PROBE

[75] Inventors: James Thomas Borthwick, Jr., Winfield; Christopher Michael Zalud, Westmont, both of Ill.

[73] Assignee: Magnetrol International, Inc., Downers Grove, Ill.

[21] Appl. No.: 532,086

[22] Filed: Sep. 22, 1995

[51] Int. Cl.$^6$ ............................... G01F 23/26
[52] U.S. Cl. .................... 324/690; 73/304 C
[58] Field of Search .................. 324/690, 686, 324/663; 73/304 C; 439/190, 199, 201, 202, 135, 147, 521, 522, 544, 559, 571, 572, 587, 592, 913; 403/197

[56] References Cited

U.S. PATENT DOCUMENTS

| | | | |
|---|---|---|---|
| 3,831,069 | 8/1974 | Merrell et al. | 73/304 C |
| 4,054,744 | 10/1977 | Beaman | 73/304 C |
| 4,499,640 | 2/1985 | Brenton et al. | 73/304 C |
| 4,809,129 | 2/1989 | Hansen, III et al. | 73/304 C |
| 5,391,839 | 2/1995 | Lang et al. | 73/304 C |
| 5,481,197 | 1/1996 | Sanders et al. | 73/304 C |

*Primary Examiner*—Michael Brock
*Attorney, Agent, or Firm*—Wood, Phillips, VanSanten, Clark & Mortimer

[57] ABSTRACT

An insulated probe assembly is disclosed for use with a process instrument adapted to detect a condition of a material in a process vessel. The probe assembly includes an adaptor receivable in an opening of the process vessel. The adaptor includes a through opening having an enlarged counterbore at an outer end defining an inner shoulder. A probe extends through the adaptor into the process vessel. The probe narrows from an outer process end to an inner end at a sloped shoulder positioned in the counterbore of the adaptor. An insulator sleeve surrounds the probe and has an inner end extending into the adaptor counterbore and engaging the shoulder, and an opposite outer end extending beyond an outer end of the probe. A plug is provided for sealing the probe in the insulator sleeve at the sleeve outer end. A tubular insulating probe cover surrounds the sloped shoulder of the probe and is at least partially received in the adaptor end of the insulator sleeve and extends beyond the shoulder. The probe is secured to the adaptor, wherein the sloped shoulder of the probe exerts a generally radial force on the probe cover to minimize stress.

23 Claims, 3 Drawing Sheets

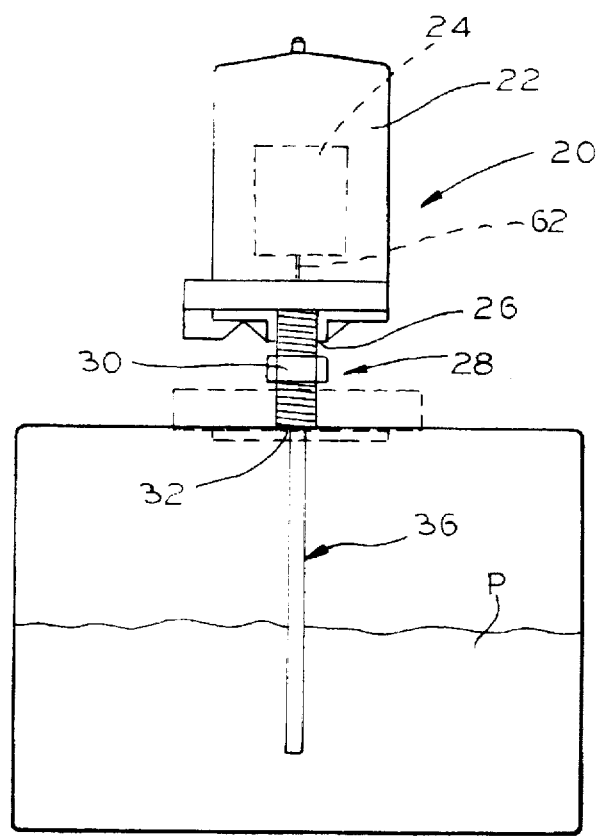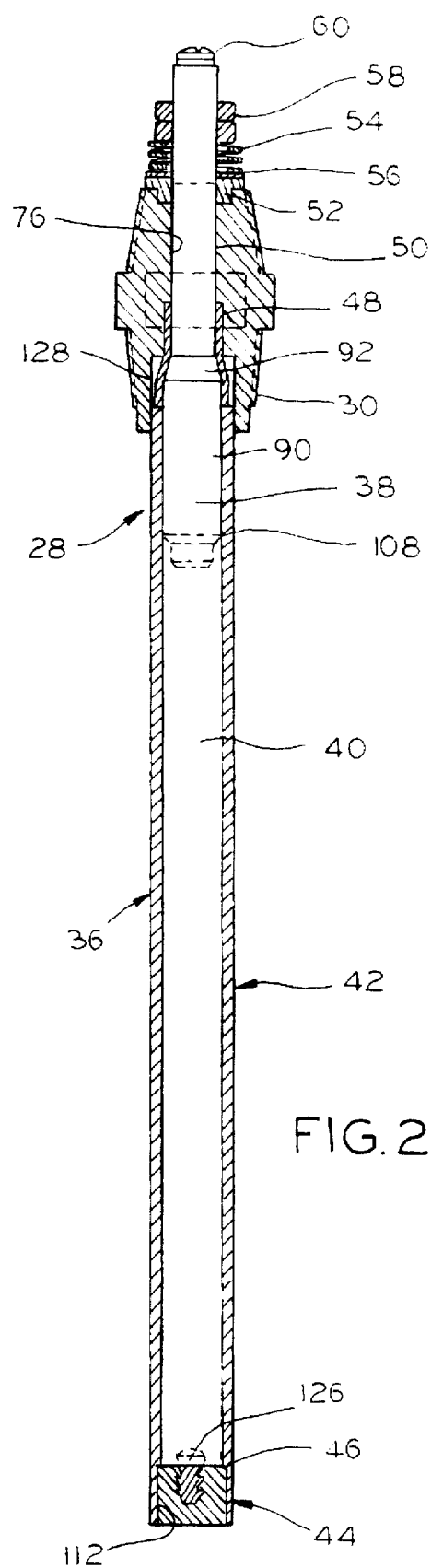

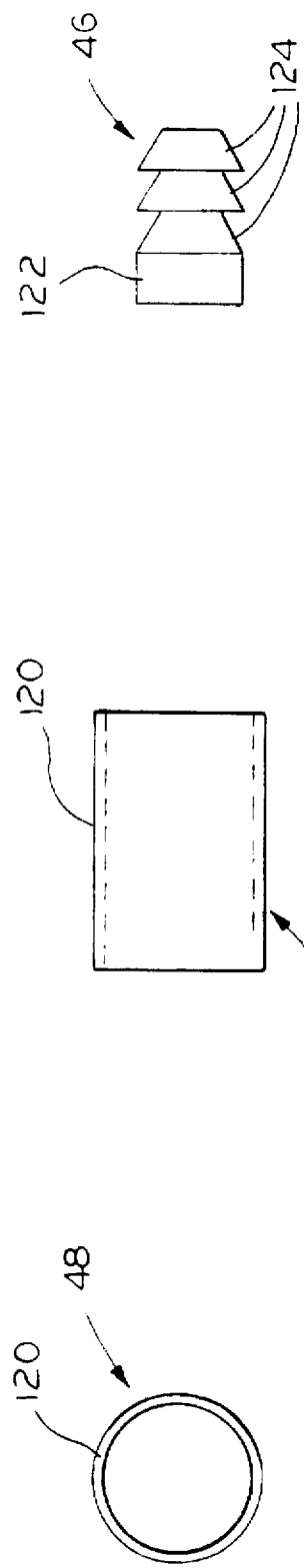
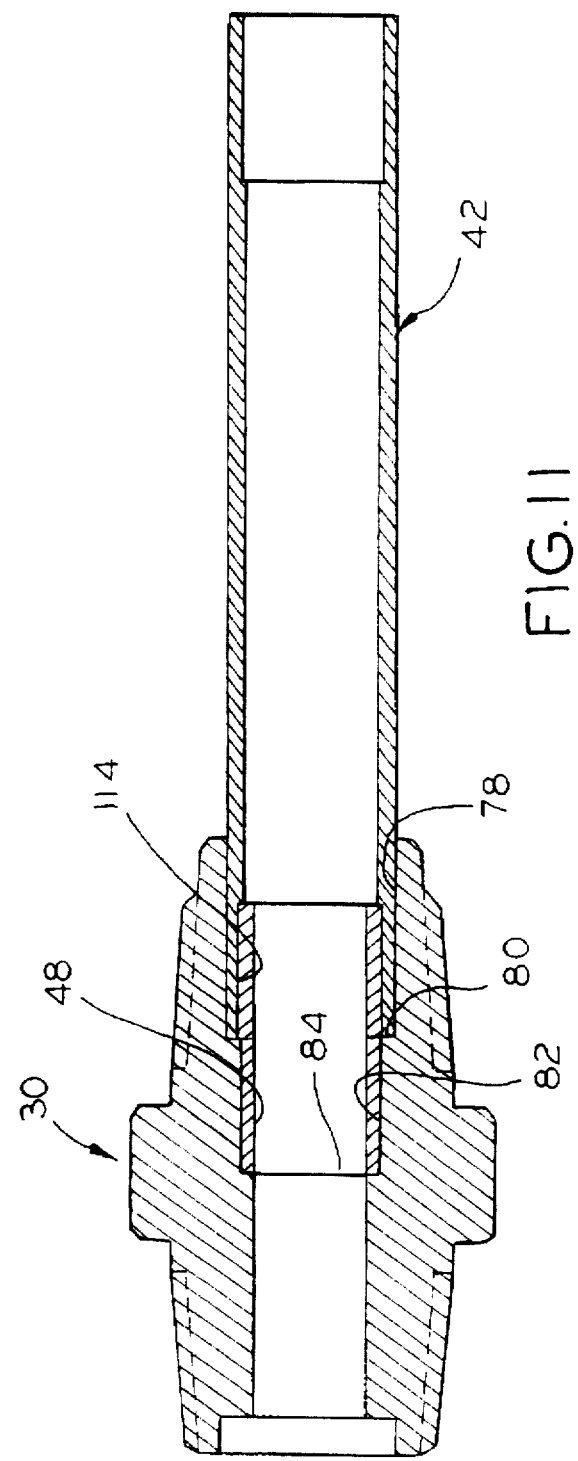

INSULATED CAPACITANCE PROBE

FIELD OF THE INVENTION

This invention relates to process instruments and, more particularly, to an insulated probe for use with a process instrument.

BACKGROUND OF THE INVENTION

Various instruments have found use for applications requiring level sensing of, for example, a liquid or bulk material in a vessel. One such instrument comprises a capacitance-type level sensor. With any such instrument it is desirable to ensure longevity of operation to minimize field replacement and/or repair.

With a capacitance-type level sensor, the process instrument includes a probe assembly. The probe assembly includes an adaptor receivable in an opening of a vessel and a probe rod extending through the adaptor into the process vessel. The probe exhibits capacitance. Capacitance increases as part of the probe is surrounded by material of dielectric constant greater than one. The capacitance present between the probe and the vessel can be measured to determine level of the material in the vessel.

To measure capacitance between the probe and the vessel the probe must be insulated from the adaptor. Also, in high temperature and/or pressure applications the interface between the probe and the adaptor must be sealed so that the vessel interior is sealed from outside. An insulated seal is often provided by a plastic bushing surrounding the probe, where it is held to the adaptor.

Particularly, a probe assembly in one form includes an adaptor receivable in an opening of the process vessel. The adaptor includes a through opening flared at an outer end. A probe extends through the adaptor into the process vessel. The probe narrows from an outer process end to an inner end at a sloped shoulder positioned in the flared opening of the adaptor. A seal in the form of an insulator sleeve surrounds the probe at the sloped shoulder. A nut is threaded to an inner end of the probe to bias the sloped shoulder through the insulator sleeve against the flared opening to secure the probe to the adaptor. Typically, an insulating washer and spring washers are included between the nut and the adaptor to isolate the probe from the adaptor and to maintain the probe under compression.

It has been found that when pressure is applied the inwardly directed force on the probe compresses the seal to the point that the seal can be cut in half at elevated temperature and pressure. As a result, the seal can fall off. Another effect of the compressing of the seal is the probe rod moves inwardly and loosens the spring washers further. Both problems cause enough movement to remove loading of the spring washers and when there is no force applied to the probe, the seal becomes loose and can leak.

A probe of the insulated type includes an insulator sleeve surrounding the probe. Often, the sleeve is made of Teflon, which can stretch at elevated temperatures. The insulator can grow about a quarter of an inch on a one foot probe. After the growth, the insulator may collapse.

The present invention is directed to solving one or more of the problems discussed above in a novel and simple manner.

SUMMARY OF THE INVENTION

In accordance with the invention there is disclosed an insulated probe assembly adapted so that the probe exerts a generally radial force on a probe cover to minimize stress.

Broadly, there is disclosed herein an insulated probe assembly for use with a process instrument adapted to detect a condition of a material in a process vessel. The probe assembly includes an adaptor receivable in an opening of the process vessel. The adaptor includes a through opening having an enlarged counterbore at an outer end defining an inner shoulder. A probe extends through the adaptor into the process vessel. The probe narrows from an outer process end to an inner end at a sloped shoulder positioned in the counterbore of the adaptor. An insulator sleeve surrounds the probe and has an inner end extending into the adaptor counterbore and engaging the shoulder, and an opposite outer end extending beyond an outer end of the probe. A plug means is provided for sealing the probe in the insulator sleeve at the sleeve outer end. A tubular insulating probe cover surrounds the sloped shoulder of the probe and is at least partially received in the adaptor end of the insulator sleeve and extends beyond the shoulder. Fastening means operatively secure the probe to the adaptor, wherein the sloped shoulder of the probe exerts a generally radial force on the probe cover to minimize stress.

According to one aspect of the invention the adaptor includes a second counterbore inwardly of the enlarged counterbore to define a second inner shoulder, the probe cover engaging the second inner shoulder.

In accordance with another aspect of the invention, the insulator sleeve comprises a Teflon tube.

In accordance with a further aspect of the invention, the insulator sleeve includes a counterbore at its inner end receiving the probe cover.

In accordance with still another aspect of the invention, the probe cover comprises an insulating Teflon tube.

In accordance with still a further aspect of the invention, the insulator sleeve comprises a heat treated Teflon tube.

In accordance with still a further aspect of the invention, the fastening means comprises an insulating washer surrounding the probe inner end and engaging an adaptor inner end and a nut threaded to the probe inner end to secure the probe to the adaptor.

In accordance with yet another aspect of the invention, the insulating washer is of relatively high temperature synthetic resinous plastic material.

In accordance with yet another aspect of the invention, the plug means comprises a plug receivable in the sleeve outer end and having an inner counterbore, and further comprising a barbed fitting extending outwardly from the probe outer end and received in the plug counterbore.

In accordance with still a further aspect of the invention, the fastening means includes a plurality of Belleville washers disposed between the nut and the washer.

In accordance with yet another aspect of the invention, an insulating heat shrink tube surrounds the probe inwardly of the insulating sleeve.

In accordance with the invention, the probe and adaptor design provides a greater radial force to form the seal. This reduces the shearing effect. Also, the seal is captured better so that when the material softens it is restrained from moving. To eliminate the stretching of the insulator sleeve, the insulator sleeve is heat treated prior to installation. Nonetheless, the barbed fitting helps to stop any minor growth after heat treating.

Further features and advantages of the invention will be readily apparent from the specification and from the drawings.

BRIEF DESCRIPTION OF THE DRAWINGS

FIG. 1 is a side view of a capacitance level process instrument including a probe assembly according to the invention mounted to a material containing vessel;

FIG. 2 is a sectional view of the probe assembly of FIG. 1;

FIG. 8 is an end view of an upper probe cover of the probe assembly;

FIG. 9 is a side view of the upper probe cover of FIG. 8;

FIG. 10 is a side view of a barbed fitting of the probe assembly; and

FIG. 11 is a sectional view of an assembly portion of the probe assembly prior to installation of the upper probe rod.

DETAILED DESCRIPTION OF THE INVENTION

Figure 3:
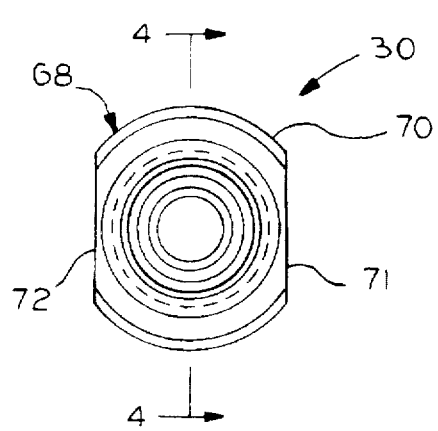
FIG. 3 is an inner end view of an adaptor of the probe assembly of FIG. 2.

With reference to FIG. 1, there is illustrated a process instrument 20 comprising a capacitance level sensing instrument. The instrument 20 includes an electric housing assembly 22 housing an electrical circuit 24 of conventional nature. The housing 22 includes a threaded opening 26 for connection to a probe assembly 28 according to the invention. The probe assembly 28 includes an adaptor 30 receivable in an opening 32 of a process vessel 34. A probe 36 extends through the adaptor into the process vessel 34.

The term "adaptor" is used herein to refer to a mechanical connection acting as both an electrical conduit and a process connection. As used herein, the term "inner" refers to a direction extending from inside the vessel 34 to outside the vessel, more particularly, from the probe 36 to the electric housing 22, and the term "outer" is used to refer to the opposite direction, that is, from the electric housing assembly 24 to the probe 36.

The process vessel may contain a process material P, the level of which is to be sensed by the instrument 20. The material P acts as a dielectric, with the capacitance between the probe 36 and vessel 34 varying as a function of the level of the material P. Particularly, a variable capacitance is formed between two electrodes, one of the electrodes being the probe 36 and the other electrode being the vessel wall 34, assuming it is conductive. If the vessel wall is not conductive, then a suitable reference electrode must be provided, as is conventional.

In accordance with the invention, the probe assembly 28 comprises an insulated probe assembly including insulating apparatus to protect the probe from harsh environments. Nevertheless, numerous of the concepts described herein are also usable with a bare probe, as will be apparent.

As described above, the probe assembly 28 includes the adaptor 30 and probe 36. In the illustrated embodiment of the invention, the probe 36 comprises a two piece probe including an upper probe rod 38 connected to a probe shaft extension 40. A probe insulator sleeve 42 surrounds the upper probe rod 38 and probe shaft extension 40. A probe plug 44 is received in an outer end of the insulator sleeve 42 and is secured to the probe shaft extension 40 with a barbed fitting 46. An upper probe cover 48 surrounds a portion of the upper probe rod 38 in the adaptor 30 to seal the same.

The upper probe rod 38 is otherwise surrounded with an insulator tube 50 within the adaptor 30. A captivating washer 52 surrounds the upper probe rod 38 inwardly of the adaptor 30 and sandwiches a plurality of Belleville washers 54 and a washer 56 along with a pair of hex nuts 58. The hex nuts 58 are threaded to an inner end of the upper probe rod 38. A screw 60 is threaded into an inner end of the upper probe rod 38 to form a terminal used for connecting an electrical conductor or wire 62, see FIG. 1, extending from the probe assembly 28 to the electrical circuit 24, as is well known.

The electrical circuit 24 and the housing 22 may comprise a circuit for determining level or may comprise simple terminations for connection to a remote housing in remote sensing applications, as is well known. In any event, the conductor 62 is connected between the probe terminal screw 60 and a corresponding terminal (not shown) on the circuit board 24, as is well known.

Figure 4:
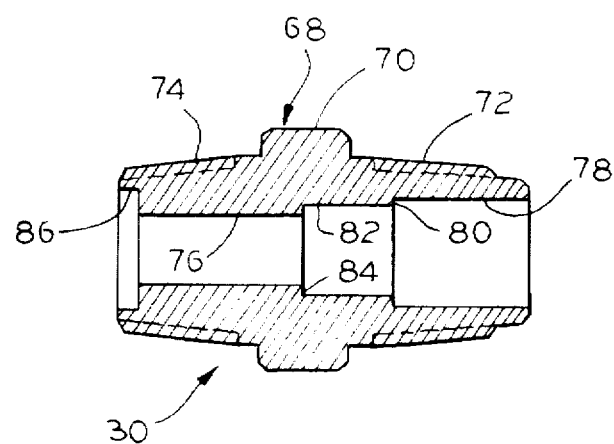
FIG. 4 is a sectional view taken along the line 4—4 of FIG. 3.

Referring to FIGS. 3 and 4, the adaptor 30 is illustrated in greater detail. The adaptor 30 comprises a generally cylindrical body 68 of, for example, of 316 stainless steel. The body 68 includes an enlarged mid-section 70 defining opposite flats 71 and 72, see FIG. 3, to be engaged by a wrench or the like when installing the probe assembly. The mid-section 70 separates a ¾" npt threaded outer wall 72 and a ¾" npt threaded inner wall 74. The threaded inner wall 74 is received in the housing bore 26. The threaded outer end wall 72 is threadably received in the vessel opening 32, as is conventional. The body 68 includes a through opening 76. An enlarged counterbore 78 is provided at an outer end defining a first inner shoulder 80. A second counterbore 82 is provided inwardly of the counterbore 78 defining a second inner shoulder 84. Similarly, a counterbore 86 is provided at the inner end for receiving the captivating washer 52, see FIG. 2.

In the illustrated embodiment of the invention, the adaptor 30 is approximately 2¼" long and the first counterbore 78 has a depth of approximately ¾" and the second counterbore 82 has a depth of approximately 1¼", so that there is ½" spacing between the shoulders 80 and 84.

Figure 5:
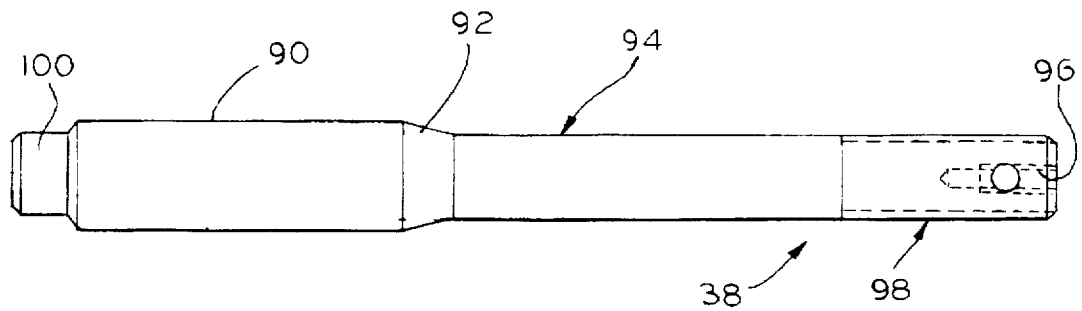
FIG. 5 is a side view of an upper probe rod of the probe assembly.

Referring to FIG. 5, the upper probe rod 38 is illustrated. The upper probe red 38 may be, for example, of stainless steel construction. The rod 38 includes a body 90 connected via a sloped shoulder 92 to a narrow neck 94. A threaded opening 96 is included in the end of the neck 94 for receiving the terminal screw 60, see FIG. 2. The neck is threaded as at 98 for receiving the nuts 58, see FIG. 2. A protrusion 100 extends from an outer end of the body 90.

Figure 6:
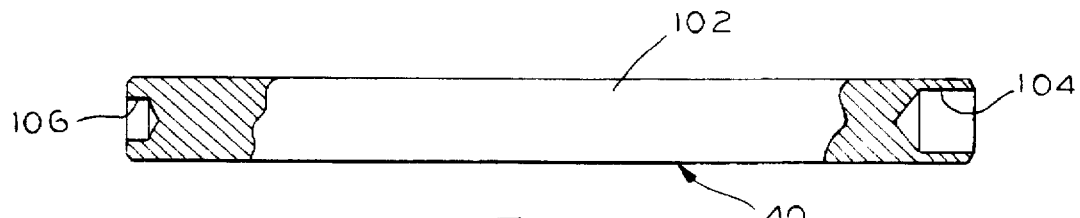
FIG. 6 is a side, partial cut-away, view of a probe shaft extension of the probe assembly.

Referring to FIG. 6, the probe shaft extension 40 is illustrated. The probe shaft extension comprises an elongate rod 102 of, for example, stainless steel, including a counterbore 104 at an inner end and a counterbore 106 at an outer end. The counterbore 104 is of a size and shape for receiving the protrusion 100 of the upper probe rod 38, see FIG. 5, for mechanically and electrically connecting the two together as at 108, see FIG. 2. The rods 102 and 38 are connected using a friction fit. The counterbore 106 receives the barbed fitting 46, see FIG. 2, for securing the probe plug 44 to the probe shaft extension 40, also using a friction fit.

Figure 7:
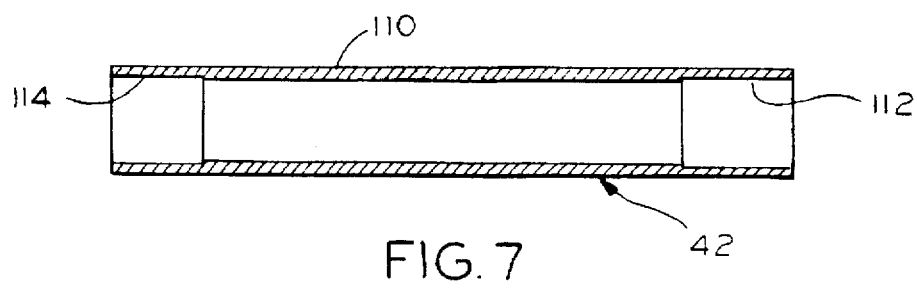
FIG. 7 is a sectional view of a probe insulator for the probe assembly.

Referring to FIG. 7, the probe insulator 42 is illustrated. The probe insulator 42 comprises a sleeve or tube 110 which may be, for example, of Teflon. A length of the tube 110 is determined by an insertion length of the probe 36. The tube 110 has an inner diameter slightly greater than outer diameter of the probe shaft extension 40 and the upper probe rod body 90 to be received thereon. An outer end of the tube 110 is reamed to form a counterbore as at 112 and at an inner end as at 114. The outer end counterbore 112 receives the probe plug 44, see FIG. 2. The inner end counterbore 114 receives the upper probe cover 48, as discussed below. The inner end counterbore 114 is reamed approximately ½" deep.

Referring to FIGS. 8 and 9, the upper probe cover 48 is illustrated. The upper probe cover 48 comprises an insulating tube 120 which may be, for example, of Teflon construction. In the illustrated embodiment of the invention, the tube 120 is one inch in length and has an outer diameter slightly smaller than the inner diameter of the insulator inner end counterbore 114 to be received therein.

Referring to FIG. 10, the barbed fitting 46 may be formed of, for example, stainless steel, and includes a plug 122 receivable in the shaft extension counterbore 106, see FIG. 6, and a plurality of frustoconical portions 124 providing barbs for engaging a counterbore 126 in the probe plug 44, as illustrated in FIG. 2.

Referring to FIG. 11, the relationship of the probe insulator 42, upper probe cover 48 and adaptor 30, without the probe 36, is illustrated. The probe insulator inner end 114 is received in the adaptor first counterbore 78 and abuts the first shoulder 80. This provides a one inch distance between the second shoulder 84 and the depth of the insulator inner end counterbore 114. The one inch long upper probe cover 48 is received in the reamed inner end 114 and the second counterbore 82 so that it abuts the shoulder 84.

It should be appreciated, that the upper probe cover 48 and probe insulator 42 may be installed on the probe 36 prior to installation in the adaptor 30. FIG. 11 illustrates the relationship among these elements prior to installation so that it is apparent how these components are configured in there normal state.

The probe assembly 28 is illustrated in the fully assembled condition in FIG. 2. The upper probe rod 38 is fitted to the probe shaft extension 40 and surrounded by the probe insulator 42. The barbed fitting 46 secures the plug 44 in the outer reamed end 112. The upper probe cover 48 is received in the inner reamed end 114 and surrounds the sloped shoulder 92 of the upper probe rod 38. The upper probe rod above the upper probe cover 48 is surrounded by the insulator 50 and is then inserted through the adaptor throughbore 76. The upper probe rod body 90 has an outer diameter greater than the throughbore 76. The captivating washer 52 is of a high temperature synthetic resinous material, such as Vespel, registered trademark of DuPont, and surrounds the upper probe rod and is received in the adaptor counterbore 86. The washer 56 and Belleville washers 54 are then placed atop the captivating washers 52 and are secured thereon via the nuts 58. The nuts 58 are tightened to maintain compression between the sloped shoulder 92 and the adaptor 30.

The described configuration results in the sloped shoulder 92 exerting a generally radial force through the probe cover 48, at a position represented at 128, to the adaptor 30. This seals the probe 36 to the adaptor 30 while minimizing stress on the upper probe cover 48.

In accordance with the invention, the use of the Vespel captivating washer 52 prevents compression of the washer at higher temperatures. The use of radial forces to form the seal minimizes shearing effects. Also, the seal is captured better so that when the Teflon material softens, it is restrained from moving.

To help compensate for seal movement, five Belleville washers 54 are used. To eliminate stretch in the probe insulator 42, the insulator 42 and upper probe cover 48 are heated to 400°–410° for a minimum of one hour prior to or during assembly. When exposed to elevated temperatures later, growth is minimal. The use of the barbed fitting in the end of the probe shaft extension helps stop any minor growth after heat treating.

Thus, in accordance with the invention, there is provided an insulated probe assembly in which a sloped shoulder portion of a probe exerts a generally radial force on an insulating probe cover to minimize stress.

We claim:

1. An insulated probe assembly for use with a process instrument adapted to detect a condition of a material in a process vessel, the insulated probe assembly comprising:
    an adaptor receivable in an opening of the process vessel, the adaptor including a through opening having an enlarged counterbore at an outer end defining an inner shoulder;
    a probe extending through the adaptor into the process vessel, the probe narrowing from an outer process end to an inner end at a sloped shoulder positioned in the adaptor counterbore;
    an insulator sleeve surrounding the probe and having an inner end extending into the adaptor counterbore and engaging the shoulder, and an opposite outer end extending beyond an outer end of the probe;
    plug means for sealing the probe in the insulator sleeve at the sleeve outer end;
    a tubular insulating probe cover surrounding the probe sloped shoulder and at least partially received in the adaptor end of the insulator sleeve and extending beyond the shoulder; and
    fastening means operatively securing the probe to the adaptor, wherein the probe sloped shoulder exerts a generally radial force on the probe cover to minimize stress.

2. The insulated probe assembly of claim 1 wherein said adaptor includes a second counterbore inwardly of the enlarged counterbore to define a second inner shoulder, the probe cover engaging the second inner shoulder.

3. The insulated probe assembly of claim 1 wherein said insulator sleeve comprises a Teflon tube.

4. The insulated probe assembly of claim 1 wherein said insulator sleeve includes a counterbore at its inner end receiving the probe cover.

5. The insulated probe assembly of claim 1 wherein said probe cover comprises an insulating tube.

6. The insulated probe assembly of claim 5 wherein said insulating tube comprises a Teflon tube.

7. The insulated probe assembly of claim 1 wherein said insulator sleeve comprises a heat treated Teflon tube.

8. The insulated probe assembly of claim 1 wherein said fastening means comprises an insulating washer surrounding the probe inner end and engaging an adaptor inner end and a nut threaded to the probe inner end to secure the probe to the adaptor.

9. The insulated probe assembly of claim 8 wherein said insulating washer is of a relatively high temperature synthetic resinous plastic material.

10. The insulated probe assembly of claim 8 wherein said fastening means further comprises a plurality of Belleville washers disposed between the nut and the washer.

11. The insulated probe assembly of claim 10 wherein said plurality comprises at least four Belleville washers.

12. The insulated probe assembly of claim 1 wherein said plug means comprises a plug receivable in the sleeve outer end and having an inner counterbore, and further comprising a barbed fitting extending outwardly from the probe outer end and received in the plug counterbore.

13. The insulated probe assembly of claim 1 wherein said probe comprises a two-piece probe including a uniform inner probe rod and an outer shaft extension having a length corresponding to a desired probe length.

14. The insulated probe assembly of claim 1 further comprising an insulating tube surrounding the probe inwardly of the insulating sleeve.

15. A probe assembly for use with a process instrument adapted to detect a condition of a material in a process vessel, the insulated probe assembly comprising:

an adaptor receivable in an opening of the process vessel, the adaptor including a through opening having an enlarged counterbore at an outer end defining an inner shoulder;

a probe extending through the adaptor into the process vessel, the probe narrowing from an outer process end to an inner end at a sloped shoulder positioned in the counterbore of the adaptor;

a tubular insulating probe cover surrounding the probe sloped shoulder to provide a seal between the probe and the adaptor; and fastening means operatively securing the probe to the adaptor, wherein the probe sloped shoulder exerts a generally radial force on the probe cover to minimize stress.

16. The probe assembly of claim 15 wherein said adaptor includes a second counterbore inwardly of the enlarged counterbore to define a second inner shoulder, the probe cover engaging the second inner shoulder.

17. The probe assembly of claim 15 wherein said probe cover comprises an insulating tube.

18. The probe assembly of claim 15 wherein said fastening means comprises an insulating washer surrounding the probe inner end and engaging an adaptor inner end and a nut threaded to the probe inner end to secure the probe to the adaptor.

19. The probe assembly of claim 18 wherein said insulating washer is of a relatively high temperature synthetic resinous plastic material.

20. The probe assembly of claim 18 wherein said fastening means further comprises a plurality of Belleville washers disposed between the nut and the washer.

21. The probe assembly of claim 20 wherein said plurality comprises at least four Belleville washers.

22. The probe assembly of claim 15 wherein said probe comprises a two-piece probe including a uniform inner probe rod and an outer shaft extension having a length corresponding to a desired probe length.

23. The probe assembly of claim 15 further comprising an insulating tube surrounding the probe inwardly of the probe cover.

* * * * *